United States Patent
Okamura et al.

(10) Patent No.: US 7,531,982 B2
(45) Date of Patent: May 12, 2009

(54) MOTOR DRIVE APPARATUS CAPABLE OF ACCURATELY ESTIMATING DEMAGNETIZATION OF PERMANENT MAGNET MOTOR

(75) Inventors: Masaki Okamura, Toyota (JP); Takashi Yamashita, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 403 days.

(21) Appl. No.: 10/559,932

(22) PCT Filed: Jul. 8, 2004

(86) PCT No.: PCT/JP2004/010091

§ 371 (c)(1),
(2), (4) Date: Dec. 8, 2005

(87) PCT Pub. No.: WO2005/025047

PCT Pub. Date: Mar. 17, 2005

(65) Prior Publication Data

US 2006/0119312 A1 Jun. 8, 2006

(30) Foreign Application Priority Data

Jul. 31, 2003 (JP) ............................. 2003-204733

(51) Int. Cl.
*H02P 27/00* (2006.01)
(52) U.S. Cl. .................. 318/701; 318/807; 318/700; 318/432
(58) Field of Classification Search ............... 318/807, 318/701, 432, 700
See application file for complete search history.

(56) References Cited

U.S. PATENT DOCUMENTS

| | | | | |
|---|---|---|---|---|
| 5,373,195 A * | 12/1994 | De Doncker et al. | ........... | 307/45 |
| 5,428,274 A * | 6/1995 | Furutani et al. | ............. | 318/139 |
| 5,585,709 A * | 12/1996 | Jansen et al. | ................ | 318/807 |
| 5,650,706 A * | 7/1997 | Yamada et al. | .............. | 318/701 |
| 5,656,911 A * | 8/1997 | Nakayama et al. | .......... | 318/718 |
| 5,789,881 A * | 8/1998 | Egami et al. | ................ | 318/139 |
| 5,883,484 A * | 3/1999 | Akao | .......................... | 318/700 |
| 5,920,161 A * | 7/1999 | Obara et al. | ................ | 318/139 |
| 6,427,794 B1 * | 8/2002 | Raftari et al. | .............. | 180/65.3 |
| 6,591,925 B2 * | 7/2003 | Raftari et al. | .............. | 180/65.3 |
| 6,679,346 B2 * | 1/2004 | Raftari et al. | .............. | 180/65.3 |

(Continued)

FOREIGN PATENT DOCUMENTS

JP      A-59-47994      3/1984

(Continued)

*Primary Examiner*—Bentsu Ro
*Assistant Examiner*—David S Luo
(74) *Attorney, Agent, or Firm*—Oliff & Berridge, PLC

(57) ABSTRACT

A map holding unit holds, in the form of a map, a voltage control amount of the q axis in a case where no demagnetization of a permanent magnet motor occurs. Based on a motor revolution number, namely the number of revolutions of the motor provided from a revolution number detection unit, a demagnetized state calculation unit calculates a rotational angular velocity. Then, based on the voltage control amount from the map holding unit, a voltage control amount to be controlled that is provided from a PI control unit and the rotational angular velocity, the demagnetized state calculation unit calculates an amount of demagnetization and outputs, if the amount of demagnetization is greater than a predetermined value, an operation signal for controlling the operation of the permanent magnet motor.

10 Claims, 4 Drawing Sheets

U.S. PATENT DOCUMENTS

| | | | |
|---|---|---|---|
| 2002/0145401 A1* | 10/2002 | Sato et al. | 318/727 |
| 2003/0062868 A1* | 4/2003 | Mir et al. | 318/599 |
| 2004/0036434 A1* | 2/2004 | Chen et al. | 318/432 |
| 2005/0174089 A1* | 8/2005 | Lin | 318/807 |

FOREIGN PATENT DOCUMENTS

| | | |
|---|---|---|
| JP | A 4-42764 | 2/1992 |
| JP | A-8-103093 | 4/1996 |
| JP | A-9-51700 | 2/1997 |
| JP | A 11-18496 | 1/1999 |
| JP | A 2001-157304 | 6/2001 |
| JP | A 2001-268970 | 9/2001 |
| JP | A 2002-10677 | 1/2002 |
| JP | A 2003-204693 | 7/2003 |

* cited by examiner

F I G. 6
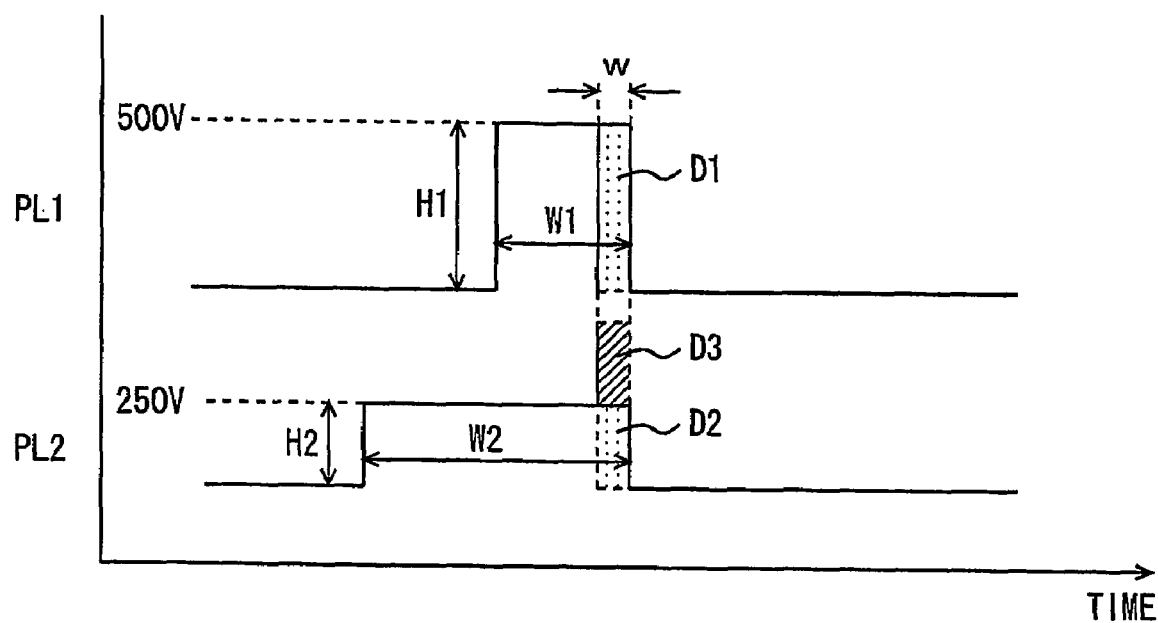

MOTOR DRIVE APPARATUS CAPABLE OF ACCURATELY ESTIMATING DEMAGNETIZATION OF PERMANENT MAGNET MOTOR

TECHNICAL FIELD

The present invention relates to a motor drive apparatus capable of estimating demagnetization of a permanent magnet motor.

BACKGROUND ART

Hybrid vehicles have recently been of great interest as environment-friendly vehicles. The hybrid vehicles are now partially commercialized.

A hybrid vehicle has, as its motive power sources, a DC (direct current) power supply, an inverter and a motor driven by the inverter in addition to a conventional engine. More specifically, the engine is driven to secure the motive power source and a DC voltage from the DC power supply is converted by the inverter into an AC voltage to be used for rotating the motor and thereby securing the motive power source as well.

Japanese Patent Laying-Open No. 2001-157304 discloses a motor drive system for a hybrid vehicle. The motor drive system estimates demagnetization of a permanent magnet of an electric rotating machine from the temperature of the permanent magnet according to data used for controlling the hybrid vehicle.

The conventional method, however, estimates demagnetization from the temperature of the permanent magnet which is estimated according to the control data for the hybrid vehicle, resulting in a problem that the demagnetization cannot accurately be estimated.

DISCLOSURE OF THE INVENTION

An object of the present invention is thus to provide a motor drive apparatus cable of accurately estimating demagnetization of a permanent magnet motor.

According to the present invention, the motor drive apparatus includes an estimation unit and an operation handling unit. The estimation unit estimates an amount of demagnetization of a permanent magnet motor based on a voltage control amount of the q axis applied in a case where the permanent magnet motor is controlled using a d-q axis transformation. The operation handling unit limits operation of the permanent magnet motor when the amount of demagnetization estimated by the estimation unit is greater than a predetermined value.

Preferably, the motor drive apparatus further includes a converter. The converter changes an input voltage necessary for driving the permanent magnet motor. The estimation unit corrects the estimated amount of demagnetization according to the level of the input voltage.

Preferably, the estimation unit estimates the amount of demagnetization by comparing the voltage control amount of the q axis to be controlled with a reference value.

Preferably, the estimation unit estimates the amount of demagnetization based on a difference between a reference value and the voltage control amount of the q axis to be controlled.

Preferably, the estimation unit holds, in the form of a map, the reference values correlated with at least two revolution numbers to extract the reference value and estimate the amount of demagnetization.

Preferably, the reference value is the voltage control amount of the q axis when no demagnetization of the permanent magnet motor occurs.

With the motor drive apparatus of the present invention, the amount of demagnetization is estimated based on the voltage control amount of the q axis applied when the permanent magnet motor is controlled using the d-q axis transformation, namely the armature flux linkage in the direction of the q axis among armature flux linkages emitted from permanent magnets. Then, if the estimated amount of demagnetization is larger than a predetermined value, the operation of the permanent magnet motor is limited.

The present invention can in this way estimate the amount of demagnetization accurately and, based on the estimated amount of demagnetization, the permanent magnet motor can appropriately be handled.

BRIEF DESCRIPTION OF THE DRAWINGS

FIG. 6 is a timing chart of voltage commands of the converter shown in FIG. 1.

BEST MODES FOR CARRYING OUT THE INVENTION

Figure 1:
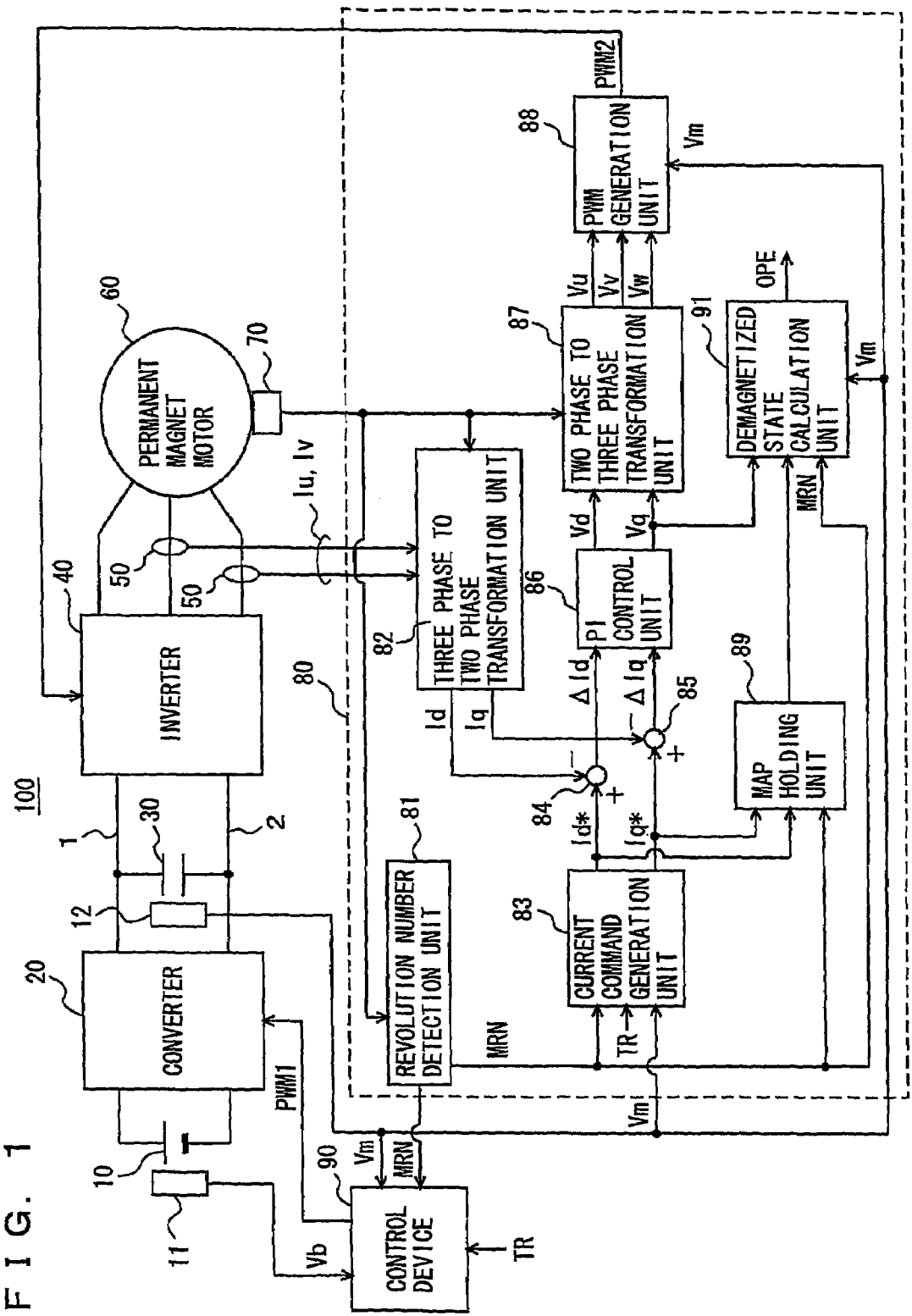
FIG. 1 is a schematic block diagram of a motor drive apparatus according to an embodiment of the present invention.

Embodiments of the present invention are hereinafter described in detail with reference to the drawings. It is noted here that like components are denoted by like reference characters and the description thereof is not repeated.

Referring to FIG. 1, according to an embodiment of the present invention, a motor drive apparatus 100 includes a DC power supply 10, voltage sensors 11 and 12, a converter 20, a capacitor 30, an inverter 40, electric-current sensors 50, a rotational position sensor 70, and control devices 80 and 90.

Converter 20 is connected between DC power supply 10 and capacitor 30. Capacitor 30 is connected between a power supply line 1 and a ground line 2.

Voltage sensor 11 detects a DC voltage Vb which is output from DC power supply 10 to output the detected voltage to control device 90. Voltage sensor 12 detects a terminal-to-terminal voltage Vm of capacitor 30 to output the detected voltage Vm to control devices 80 and 90.

Converter 20 increases DC voltage Vb from DC power supply 10 in response to signal PWM1 from control device 90 to apply the increased voltage to capacitor 30. Capacitor 30 then smoothes the DC voltage from converter 20 to apply the smoothed DC voltage to inverter 40.

Inverter 40 receives the DC voltage via capacitor 30 to convert the DC voltage into an AC voltage in response to signal PWM2 from control device 80 and thereby drive a permanent magnet motor 60, Electric-current sensors 50 detect motor currents Iu and Iv flowing through permanent magnet motor 60 to output the detected motor currents Iu and Iv to control device 80. In FIG. 1, there are provided only two current sensors 50 for the following reason. It is supposed here that permanent magnet motor 60 is a three-phase motor. Then, motor currents Iu and Iv flowing through two phases respectively may be detected to calculate, from the detected motor currents Iu and Iv, motor current Iw flowing through the remaining phase. Therefore, if these motor currents Iu, Iv and Iw flowing through respective three phases are to be detected separately, three current sensors 50 may be provided.

Permanent magnet motor 60 which is the three-phase motor includes U, V and W-phase coils as stator coils.

Rotational position sensor 70 detects a rotational position of a rotor of permanent magnet-motor 60 to output a sensor value θ indicative of the detected rotational position to control device 80.

Control device 80 includes a revolution number detection unit 81, a three-phase to two-phase transformation unit 82, a current command generation unit 83, subtracters 84 and 85, a PI control unit 86, a two-phase to three-phase transformation unit 87, a PWM generation unit 88, a map holding unit 89, and a demagnetized state calculation unit 91.

Revolution number detection unit 81 receives sensor value θ from rotational position sensor 70 to detect a motor revolution number MEN (number of revolutions of the motor) based on the received sensor value θ. Revolution number detection unit 81 then outputs this motor revolution number MRN to current command generation unit 83, map holding unit 89, demagnetized state calculation unit 91 and control device 90.

Three-phase to two-phase transformation unit 82 receives respective motor currents Iu and Iv from two current sensors 50, 50. Based on motor currents-Iu and Iv, three-phase to two-phase transformation unit 82 calculates motor current Iw(=−Iu−Iv).

Then, three-phase to two-phase transformation unit 82 performs three-phase to two-phase transformation on motor currents Iu, Iv and Iw using sensor value θ from rotational position sensor 70. Specifically, three-phase to two-phase transformation unit 82 substitutes motor currents Iu, Iv and Iw and sensor value θ into the following expression to calculate current values Id and Iq.

$$\begin{bmatrix} Id \\ Iq \end{bmatrix} = \frac{2}{3} \begin{bmatrix} -\cos\theta & -\cos\left(\theta - \frac{2}{3}\pi\right) & -\cos\left(\theta + \frac{2}{3}\pi\right) \\ \sin\theta & \sin\left(\theta - \frac{2}{3}\pi\right) & \sin\left(\theta + \frac{2}{3}\pi\right) \end{bmatrix} \begin{bmatrix} Iu \\ Iv \\ Iw \end{bmatrix} \quad (1)$$

More specifically, using sensor value θ, three-phase to two-phase transformation unit 82 transforms respective three-phase motor currents Iu, Iv and Iw flowing through respective three-phase coils of permanent-magnet motor 60 into current values Id and Iq. Three-phase to two-phase transformation unit 82 then outputs the calculated current values Id and Iq to subtracters 84 and 85 respectively.

Current command generation unit 83 receives a torque command value TR from an ECU (Electrical Control Unit) provided outside motor drive apparatus 100, receives motor revolution number MRN from revolution number detection unit 81 and receives voltage Vm from voltage sensor 12. Then, current command generation unit 83 generates, based on these torque command value TR, motor revolution number MRN and voltage Vm, current commands Id* and Iq* for outputting the torque indicated by torque command value TR, outputs the generated current command Id* to subtracter 84 and map holding unit 89 and outputs the generated current command Iq* to subtracter 85 and map holding unit 89.

Subtracter 84 calculates deviation ΔId between current command Id* and current value Id to output the calculated deviation ΔId to PI control unit 86. Subtracter 85 calculates deviation ΔMq between current command Iq* and current value Iq to output the calculated deviation ΔIq to PI control unit 86.

PI control unit 86 uses a PI gain for deviations ΔId and ΔIq to calculate voltage control amounts Vd and Vq for adjusting the motor current, outputs the calculated voltage control amount Vd to two-phase to three-phase transformation unit 87 and outputs the calculated voltage control amount Vq to two-phase to three-phase transformation unit 87 and demagnetized state calculation unit 91.

Two-phase to three-phase transformation unit 87 performs two-phase to three-phase transformation on voltage control amounts Vd and Vq from PI control unit 86 using sensor value θ from rotational position sensor 70. Specifically, two-phase to three-phase transformation unit 87 substitutes voltage control amounts Vd and Vq from PI control unit 86 and sensor value θ from rotational position sensor 70 into the following expression to calculate voltage control amounts Vu, Vv and Vw to be applied to the three-phase coils of permanent magnet motor 60.

$$\begin{bmatrix} Vu \\ Vv \\ Vw \end{bmatrix} = \begin{bmatrix} -\cos\theta & \sin\theta \\ -\cos\left(\theta - \frac{2}{3}\pi\right) & \sin\left(\theta - \frac{2}{3}\pi\right) \\ -\cos\left(\theta + \frac{2}{3}\pi\right) & \sin\left(\theta + \frac{2}{3}\pi\right) \end{bmatrix} \begin{bmatrix} Vd \\ Vq \end{bmatrix} \quad (2)$$

In other words, using sensor value θ, two-phase to three-phase transformation unit 87 transforms voltage control amounts Vd and Vq applied to the d axis and the q axis into voltage control amounts Vu, Vv and Vw applied to the three-phase coils of permanent magnet motor 60.

Then, two-phase to three-phase transformation unit 87 outputs voltage control amounts Vu, Vv and Vw to PWM generation unit 88.

PWM generation unit 88 generates signal PWM based on voltage control amounts Vu, Vv and Vw and voltage Vm from voltage sensor 12 to output the generated signal PWM to inverter 40. More specifically, PWM generation unit 88 sets the amplitude and width of a pulse according to the level of voltage Vm to generate signal PWM2. Here, if the level of voltage Vm is relatively higher, PWM generation unit 88 makes the amplitude of the pulse relatively higher while making the width thereof relatively smaller to generate signal PVWM2.

Map holding unit 89 holds a map showing a voltage control amount Vq_map of the q axis measured for each pair of current commands Id* and Iq*, and the control amount is correlated with at least two motor revolution numbers. This voltage control amount Vq_map is a voltage control amount of the q axis in a case where permanent magnet motor 60 is not demagnetized.

Map holding unit 89 receives current commands Id* and Iq* from current command generation unit 83 and receives motor revolution number MRN from revolution number detection unit 81 to extract voltage control amount Vq_map correlated with these motor revolution number MRN and current commands Id* and Iq* and output the extracted control amount to demagnetized state calculation unit 91.

Demagnetized state calculation unit 91 calculates, according to a method hereinafter described, an amount of demagnetization of permanent magnet motor 60 based on voltage control amount Vq of the q axis from PI control unit 86, voltage control amount Vq_map from map holding unit 89 and motor revolution number MRN from revolution number detection unit 81, and limits the current to be flown to permanent magnet motor 60 or motor revolution number MRN of permanent magnet motor 60 or outputs operation signal OPE for outputting a warning to the outside if the calculated amount of demagnetization is greater than a predetermined value.

Moreover, demagnetized state calculation unit 91 corrects, with a method hereinlater described, the calculated amount of demagnetization according to the level of voltage Vm from voltage sensor 12.

Control device 90 generates signal PWM1 for controlling converter 20 based on torque command value TR from the external ECU, DC voltage Vb from voltage sensor 11, voltage Vm from voltage sensor 12 and motor revolution number MRN from revolution number detection unit 81, and outputs the generated signal PWM1 to converter 20.

More specifically, control device 90 calculates a voltage command for converter 20 based on torque command value TR and motor revolution number MRN to generate, based on the calculated voltage command, DC voltage Vb and voltage Vm, signal PWM1 for setting voltage Vm to the voltage command.

Figure 2:
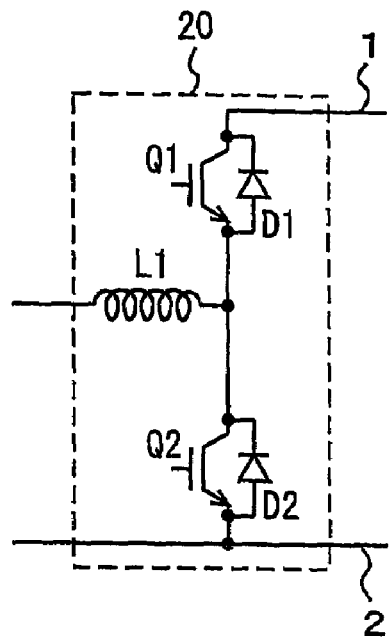
FIG. 2 is a circuit diagram of a converter shown in FIG. 1.

FIG. 2 is a circuit diagram of converter 20 shown in FIG. 1. Referring to FIG. 2, converter 20 includes NPN transistors Q1 and Q2, diodes D1 and D2 and a reactor L1. NPN transistors Q1 and Q2 are connected in series between power-supply line 1 and ground line 2. Reactor L1 has one end connected to the intermediate point between NPN transistor Q1 and NPN transistor Q2 and the other end connected to the positive electrode of DC power supply 10. Between respective collectors and emitters of NPN transistors Q1 and Q2, diodes D1 and D2 for allowing current to flow from the emitter to the collector of the transistors each are connected respectively.

Figure 3:
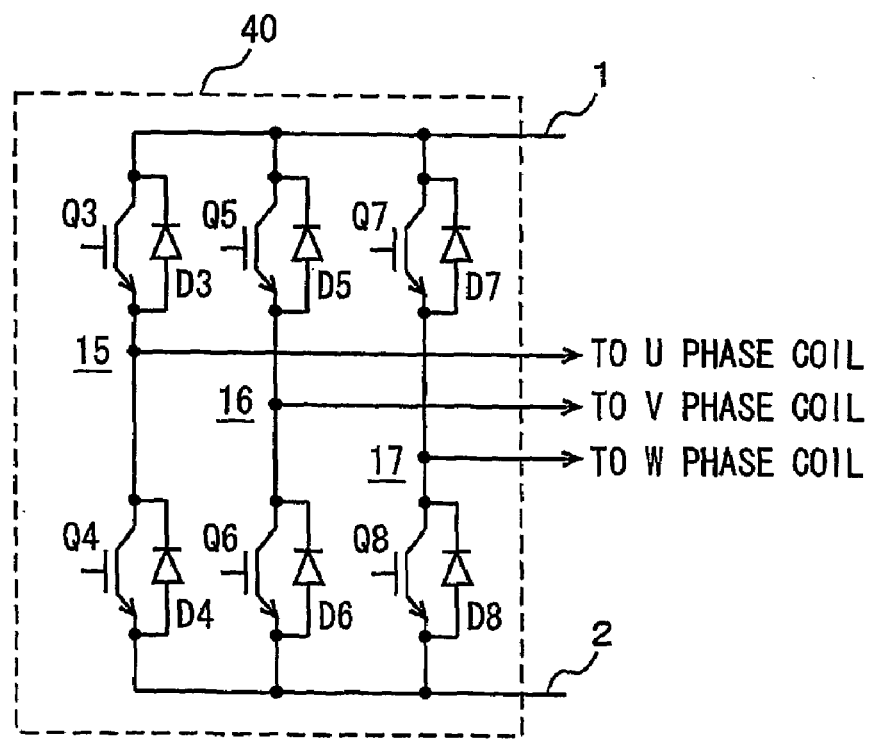
FIG. 3 is a circuit diagram of an inverter shown in FIG. 1.

FIG. 3 is a circuit diagram of inverter 40 shown in FIG. 1. Referring to FIG. 3, inverter 40 includes a U phase arm 15, a V phase arm 16 and a W phase arm 17. U phase arm 15, V phase arm 16 and W phase arm 17 are provided in parallel between power-supply line 1 and ground line 2.

U phase arm 15 is comprised of NPN transistors Q3 and Q4 connected in series, V phase arm 16 is comprised of NPN transistors Q5 and Q6 connected in series, and W phase arm 17 is comprised of NPN transistors Q7 and Q8 connected in series. Between respective collectors and emitters of NPN transistors Q3-Q8, diodes D3-D8 for allowing current to flow from the emitter to the collector of NPN transistors Q3-Q8 each are connected respectively.

The intermediate point of the phase arms each of inverter 40 is connected to an end of the phase coils each of permanent magnet motor 60. In other words, the end of the U phase coil of permanent magnet motor 60 is connected to the intermediate point between NPN transistors Q3 and Q4, the end of the V phase coil thereof is connected to the intermediate point between NPN transistors Q5 and Q6 and the end of the W phase coil thereof is connected to the intermediate point between NPN transistors Q7 and Q8.

Figure 4A:
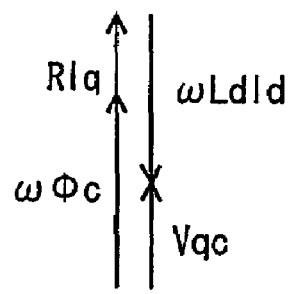
FIGS. 4A and 4B conceptually illustrate how to calculate an amount of demagnetization of a permanent magnet motor shown in FIG. 1.
Figure 4B:
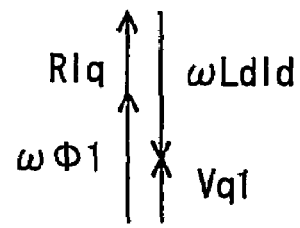

FIGS. 4A and 4B conceptually illustrate how to calculate an amount of demagnetization of permanent magnet motor 60 shown in FIG. 1. The voltage generated by magnets of permanent magnet motor 60 appears in the direction of the q axis.

Thus, according to the present invention, the amount of demagnetization of permanent magnet motor 60 is calculated based on voltage control amount Vq of the q axis that is applied when permanent magnet motor 60 is controlled using the d-q axis transformation.

In the case where permanent magnet motor 60 is controlled with the d-q axis transformation, the voltage of the q axis is represented by the following voltage equation:

$$Vq = \omega\Phi - \omega LdId + RIq \quad (3)$$

where $\omega$ is rotational angular velocity, $\Phi$ is armature flux linkage by permanent magnets, Ld is inductance of the q axis, R is armature resistance, Id is d axis component of armature current and Iq is q axis component of the armature current.

In equation (3), the term $\omega LdId$ is used for field-weakening control.

FIG. 4A shows a case where no demagnetization occurs while FIG. 4B shows a case where demagnetization occurs. If demagnetization does not occur, the armature flux linkage is $\Phi c$ and the voltage control amount of the q axis is Vqc. Then, in the case where no demagnetization occurs, the following expression is established.

$$Vqc = \omega\Phi c - \omega LdId + RIq \quad (4)$$

If demagnetization occurs, the armature flux linkage is $\Phi 1$ and the voltage control amount of the q axis is Vq1. Then, in the case where demagnetization occurs, the following expression is established.

$$Vq1 = \omega\Phi 1 - \omega LdId + RIq \quad (5)$$

Expression (5) is then subtracted from expression (4):

$$Vqc - Vq1 = \omega(\Phi c - \Phi 1)$$

$$\Phi c - \Phi 1 = (Vqc - Vq1)/\omega \quad (6).$$

There is a relation $\Phi 1 < \Phi c$ in the case where demagnetization occurs so that the left side of expression (6) represents an amount of change in armature flux linkage, namely an amount of demagnetization.

Therefore, the right side of expression (6) can be calculated to determine the amount of demagnetization.

According to the present invention, voltage control amount Vqc of the q axis in the case where no demagnetization occurs is measured in advance for each pair of current commands Id* and Iq* and the resultant value Vq_map is held in the form of the map. Then, the measured value Vq_map, voltage control amount Vq1 to be controlled and rotational angular velocity $\omega$ are substituted into expression (6) to determine the amount of demagnetization $\Phi c - \Phi 1$.

If the determined amount of demagnetization $\Phi c - \Phi 1$ is a positive value, demagnetization of permanent magnet motor 60 occurs. If the determined amount of demagnetization $\Phi c - \Phi 1$ is zero, no demagnetization of permanent magnet motor 60 occurs.

Thus, according to the present invention, the amount of demagnetization is calculated based on voltage control amount Vq of the q axis in controlling permanent magnet motor 60 through the d-q axis transformation. Then, from the calculated amount of demagnetization, it is determined whether or not demagnetization of permanent magnet motor 60 occurs.

Figure 5:
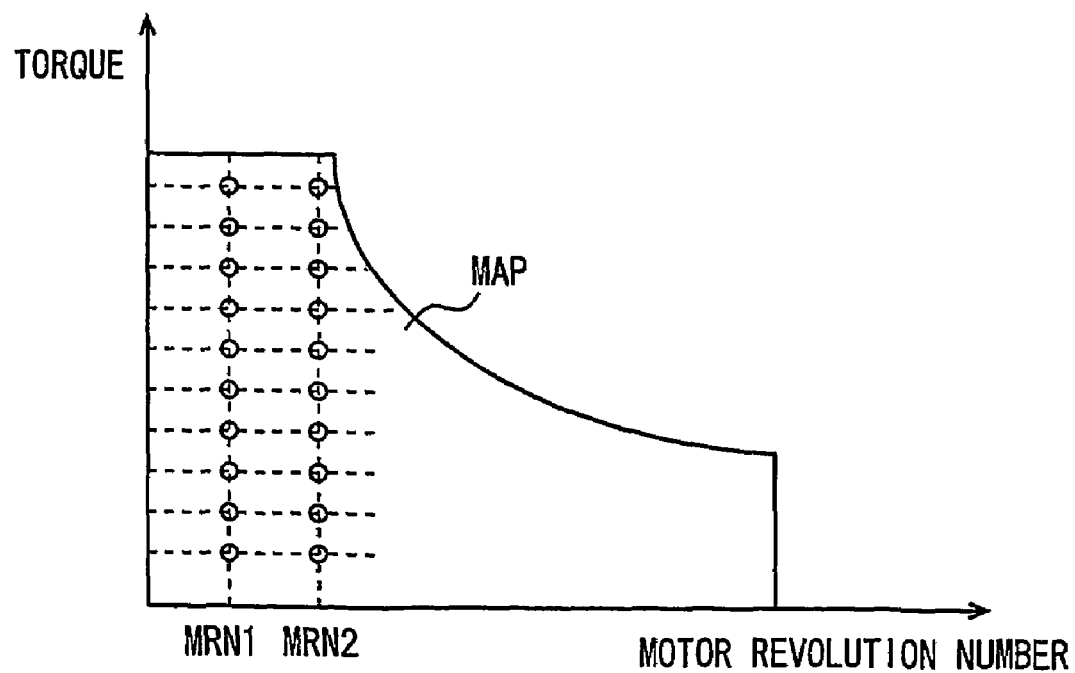
FIG. 5 conceptually shows a map held by a map holding unit shown in FIG. 1.

FIG. 5 conceptually shows the map held by map holding unit 89 shown in FIG. 1. Referring to FIG. 5, this map MAP is comprised of a plurality of voltage control amounts Vq_map each located at a point of intersection between a line representing a motor revolution number and a line representing a torque. The white circles in FIG. 5 each represent voltage control amount Vq_map.

This map MAP includes voltage control amounts Vq_map for at least two motor revolution numbers MRN1 and MRN 2.

Regarding permanent magnet motor 60, the torque is a function between the d axis component Id and the q axis component Iq of the armature current, so that the torque shown in FIG. 5 represents the d axis component Id and the q axis component Iq of the armature current. Therefore, the fact that voltage control amount Vq_map is located at the point of intersection between a line representing a motor revolution number and a line representing a torque means that voltage control amount Vq_map is located at the point of intersection between the line representing the motor revolution number and respective lines representing the d axis component Id and the q axis component Iq of the armature current. In other words, map MAP is comprised of voltage control amounts Vq_map correlated with motor revolution numbers MRN1, MRN2 and the d axis component Id and the q axis component Iq of the armature current.

Referring again to FIG. 1, map holding unit 89 receives current commands Id* and Iq* from current command generation unit 83 and receives motor revolution number MRN from revolution number detection unit 81. As discussed above, map MAP is comprised of voltage control amounts Vq_map correlated with motor revolution numbers MRN1 and MRN2 and d axis and q axis components Id and Iq of the armature current. Then, map holding unit 89 extracts from map MAP voltage control amount Vq_map located at the point correlated with current commands Id* and Iq* from current command generation unit 83 and motor revolution number MRN from revolution number detection unit 81 to output the extracted voltage control amount Vq_map to demagnetized state calculation unit 91.

Demagnetized state calculation unit 91 receives voltage control amount Vq from PI control unit 86, receives voltage control amount Vq_map from map holding unit 89 and receives motor revolution number MRN from revolution number detection unit 81. Then, demagnetized state calculation unit 91 calculates rotational angular velocity ω based on motor revolution number MRN from revolution number detection unit 81 and substitutes the calculated rotational angular velocity co and voltage control amounts Vq_map and Vq into expression (6). In this case, voltage control amount Vq_map is substituted for Vqc of expression (6) and voltage control amount Vq is substituted for Vq1 of expression (6).

If the result of calculation Φc−Φ1 is larger than a predetermined value, demagnetized state calculation unit 91 determines that demagnetization of permanent magnet motor 60 occurs to generate operation signal OPE and output this signal to the external ECU. In contrast, if the result of calculation Φc−Φ1 is equal to or smaller than the predetermined value, demagnetized state calculation unit 91 determines that no demagnetization of permanent magnet motor 60 occurs.

In this way, demagnetized state calculation unit 91 calculates an amount of change in armature flux linkage based on voltage control amount Vq_map which is measured in advance when no demagnetization of permanent magnet motor 60 occurs as well as voltage control amount Vq to be controlled and determines, from the result of the calculation, whether or not demagnetization of permanent magnet motor 60 occurs.

If demagnetization of permanent magnet motor 60 occurs, sensor value θ from rotational position sensor 70 reflects the demagnetization and accordingly, three-phase to two-phase transformation unit 82 transforms motor currents Iu, Iv and Iw into current values Id and Iq with sensor value θ reflecting the demagnetization. Current values Id and Iq are thus influenced by demagnetization.

PI control unit 86 then uses a PI gain for deviations ΔId (=Id*−Id) and ΔIq(=Iq*−Iq) to calculate voltage control amounts Vd and Vq for adjusting the motor current, so that voltage control amount Vq is a value reflecting demagnetization.

Accordingly, with the result of calculation Φc−Φ1 performed through substitution of voltage control amounts Vq_map and Vq into expression (6), whether or not demagnetization of permanent magnet motor 60 occurs can be determined.

Demagnetized state calculation unit 91 corrects, according to the input voltage of inverter 40, namely the level of output voltage Vm of converter 20, the amount of demagnetization Φc−Φ1 which is calculated by the above-described method.

FIG. 6 is a timing chart of voltage commands of converter 20 shown in FIG. 1. It is herein described above that voltage control amount Vq_map in the case where no demagnetization of permanent magnet motor 60 occurs is measured in advance. The measured voltage control amount Vq_map includes the dead time of NPN transistors Q3-Q8 that are components of inverter 40.

Referring to FIG. 6, when the DC voltage applied to inverter 40 is 500 V, the voltage command of the q axis, namely voltage control amount Vq_map, is represented by signal PL1. Signal PL1 is a pulse signal with width W1 and height H1. This signal PL1 includes dead time D1. Dead time D1 has the same height H1 as that of signal PL1 and width w.

When the DC voltage applied to inverter 40 decreases to 250 V, the voltage command of the q axis, namely voltage control amount Vq_map, is represented by signal PL2. Signal PL2 is a pulse signal with width W2 and height H2. Since the DC voltage applied to inverter 40 decreases from 500 V to 250 V, the width and height are those values represented respectively by width W2=2×W1 and height H2=(H1)/2.

Then, the dead time which should essentially be included in signal PL2 is dead time D2 having height H2 and width w. However, with voltage control amount Vq_map being measured at the DC voltage of 500 V, signal PL2 has the same dead time D1 as that of signal PL1 if no dead time correction is made for addressing the decrease in DC voltage applied to inverter 40. In other words, signal PL2 includes an extra dead time D3 in addition to dead time D2 which should essentially be included.

Accordingly, if the DC voltage applied to inverter 40 decreases, voltage control amount Vq_map has to be corrected by, removing the extra dead time D3. Moreover, if the DC voltage applied to inverter 40 increases, voltage control amount Vq_map has to be corrected by adding the shortage dead time.

Then, demagnetized state calculation unit 91 corrects voltage control amount Vq_map from map holding unit 89 by expressions (7) and (8) according to the level of voltage Vm from voltage sensor 12.

$$Vq\_map\_ad = Vq\_map \pm Vdead\_q \quad (7)$$

$$Vdead\_q = (Vmi - Vmnf)*(Di)*(fc)*\cos\beta*(3)^{1/2} \quad (8)$$

where Vmi is input voltage to inverter 40 in measuring voltage control amount Vq_map, Vmf is input voltage to inverter 40 under control, Di is dead time in measuring voltage control amount Vq_map, fc is switching frequency of inverter 40, and P is angle formed by the q axis and a current vector.

In expression (7), the sign "−" in the sign "±" indicates a decrease in DC voltage which is input to inverter 40 and the sign "+" therein indicates an increase in DC voltage input to inverter 40.

Demagnetized state calculation unit 91 then substitutes the corrected voltage control amount Vq_map_ad, voltage control amount Vq to be controlled and rotational angular velocity ω into expression (6) to calculate the amount of demagnetization Φc−Φ1.

In this case, since the amount of demagnetization Φc−Φ1 is calculated using the corrected voltage control amount Vq_map_ad, the calculation of the amount of demagnetization Φc−Φ1 with the corrected voltage control amount Vq_map_ad corresponds to correction of the amount of demagnetization Φc−Φ1.

In other words, demagnetized state calculation unit 91 corrects the amount of demagnetization Φc−Φ1 according to the level of the input voltage to inverter 40. It is noted that the correction of the dead time according to the input voltage can be made by providing Vq_maps correlated with respective voltages.

As motor drive apparatus 100 includes converter 20 as shown in FIG. 1, the level of voltage Vm applied to inverter 40 varies depending on the output torque of permanent magnet motor 60.

It is thus advantageous that the amount of demagnetization is corrected according to the level of the DC voltage applied to inverter 40 in terms of accurate determination of the amount of demagnetization for motor drive apparatus 100 having converter 20.

If the switching frequency of inverter 40 changes, the influence of the dead time accordingly changes. Therefore, according to the present invention, voltage control amount Vq_map may also be corrected if the switching frequency of inverter 40 under control changes from the switching frequency of inverter 40 at the time when voltage control amount Vq_map is measured.

As discussed above, demagnetized state calculation unit 91 calculates the difference between voltage control amount Vq_map of the q axis in the case where no magnetization of permanent magnet motor 60 occurs and voltage control amount Vq to be controlled that is calculated by PI control unit 86 to estimate the amount of demagnetization Φc−Φ1. According to the present invention, voltage control amount Vq to be controlled may be compared with voltage control amount Vq_map (corresponding to "reference value") to determine whether or not demagnetization of permanent magnet motor 60 occurs according to the result of the comparison.

In this case, demagnetized state calculation unit 91 determines that demagnetization of permanent magnet motor 60 occurs if voltage control amount Vq is smaller than voltage control amount Vq_map and determines that no demagnetization of permanent magnet motor 60 occurs if voltage control amount Vq is equal to voltage control amount Vq_map.

Motor drive apparatus 100 described above is mounted on a hybrid vehicle. If demagnetization of permanent magnet motor 60 occurs, the external ECU instructs control device 80 to stop permanent magnet motor 60 according to operation signal OPE from demagnetized state calculation unit 91 and accordingly performs control in such a manner that the vehicle-runs with the engine. The hybrid vehicle can thus be run safely.

It is seen from the above that accurate estimation of the amount of demagnetization of permanent magnet motor 60 is particularly effective if motor drive apparatus 100 is mounted on a hybrid vehicle.

"Estimation means" for estimating the amount of demagnetization of permanent magnet motor 60 is comprised of map holding unit 89 and demagnetized state calculation unit 91.

"Operation handling means" for limiting the operation of permanent magnet motor 60 is implemented by a function of demagnetized state calculation unit 91 of outputting operation signal OPE if the calculated amount of demagnetization is larger than a predetermined value, among several functions of demagnetized state calculation unit 91.

Moreover, while it is described above that voltage control amount Vq_map is extracted according to current commands Id* and Iq*, the present invention is not limited to this and voltage control amount Vq_map may be extracted according to currents Id and Iq detected by current sensors 50 and undergo transformation by three-phase to two-phase transformation unit 82.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is applied to a motor drive apparatus capable of accurately estimating demagnetization of a permanent magnet motor.

The invention claimed is:

1. A motor drive apparatus comprising:
a permanent magnet motor; and
a controller that:
estimates an amount of demagnetization of the permanent magnet motor based on a voltage control amount of a q axis applied under control of the permanent magnet motor using a d-q axis transformation; and
limits an output of the permanent magnet motor when the estimated amount of demagnetization is larger than a predetermined value, wherein
the controller (i) obtains a reference value that is the voltage control amount of only the q axis among the respective voltage control amount of the q axis and a d axis in a case where the permanent magnet motor is not demagnetized, according to a current and a motor revolution number of the permanent magnet motor being controlled, and (ii) estimates the amount of demagnetization based on a comparison between the reference value and an actual value under the control of the voltage control amount of only the q axis among the respective voltage control amount of the q axis and the d axis.

2. The motor drive apparatus according to claim 1, further comprising:
a converter changing an input voltage necessary for driving the permanent magnet motor, wherein the controller corrects the estimated amount of demagnetization according to a level of the input voltage.

3. The motor drive apparatus according to claim 1, wherein the controller estimates the amount of demagnetization based on which one of the reference value and the actual value under the control of the voltage control amount of the q axis is larger.

4. motor drive apparatus according to claim 3, wherein the controller holds a map that is configured based on a relationship between the voltage control amount of the q axis and a combination of current command values of the d and q axes and the motor revolution number that are preliminarily measured in a case where the permanent magnet motor is not demagnetized, and
the controller obtains the reference value from the map based on present values of the current command values of the d and q axes and a present value of the motor revolution number.

5. The motor drive apparatus according to claim 3, wherein the controller holds a map that is configured based on a relationship between the voltage control amount of the q axis and a combination of measured current values of the d and q axes and the motor revolution number that are preliminarily measured in a case where the permanent magnet motor is not demagnetized, and the controller obtains the reference value from the map based on present values of the measured current values of the d and q axes and a present value of the motor revolution number.

6. The motor drive apparatus according to claim 1, wherein the controller estimates the amount of demagnetization based on a difference between the reference value and the actual value under the control of the voltage control amount of the q axis.

7. The motor drive apparatus according to claim 6, wherein the controller holds a map that is configured based on a relationship between the voltage control amount of the q axis and a combination of current command values of the d and q axes and the motor revolution number that are preliminarily measured in a case where the permanent magnet motor is not demagnetized, and the controller obtains the reference value from the map based on present values of the current command values of the d and q axes and a present value of the motor revolution number.

8. The motor drive apparatus according to claim 6, wherein the controller holds a map that is configured based on a relationship between the voltage control amount of the q axis and a combination of measured current values of the d and q axes and the motor revolution number that are preliminarily measured in a case where the permanent magnet motor is not demagnetized, and the controller obtains the reference value from the map based on present values of the measured current values of the d and q axes and a present value of the motor revolution number.

9. The motor drive apparatus according to claim 1, further comprising an inverter, wherein the voltage control amount is corrected by adjusting dead time of transistors in the inverter when voltage applied to the inverter changes.

10. The motor drive apparatus according to claim 1, further comprising an inverter, wherein the voltage control amount is corrected by adjusting dead time in measuring the voltage control amount when voltage applied to the inverter changes.

* * * * *